(12) United States Patent
Krancher et al.

(10) Patent No.: US 10,923,026 B2
(45) Date of Patent: Feb. 16, 2021

(54) KEYBOARD BACKLIGHTS VIA DISPLAY SURFACES

(71) Applicant: HEWLETT-PACKARD DEVELOPMENT COMPANY, L.P., Houston, TX (US)

(72) Inventors: Robert E. Krancher, Houston, TX (US); Kent E. Biggs, Houston, TX (US); Steven L. Sinclair, Palo Alto, CA (US); Jason Lee Warkentin, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/076,924

(22) PCT Filed: Jan. 31, 2017

(86) PCT No.: PCT/US2017/015723
§ 371 (c)(1),
(2) Date: Aug. 9, 2018

(87) PCT Pub. No.: WO2018/143910
PCT Pub. Date: Aug. 9, 2018

(65) Prior Publication Data
US 2019/0066576 A1   Feb. 28, 2019

(51) Int. Cl.
*G09G 3/3208* (2016.01)
*G06F 1/16* (2006.01)
*G06F 3/0488* (2013.01)
*G06F 3/02* (2006.01)
(Continued)

(52) U.S. Cl.
CPC ......... *G09G 3/3208* (2013.01); *G06F 1/1616* (2013.01); *G06F 1/1637* (2013.01);
(Continued)

(58) Field of Classification Search
CPC ........ G09G 3/3208; G09G 5/24; G09G 5/373; G09G 5/38; G09G 2354/00;
(Continued)

(56) References Cited

U.S. PATENT DOCUMENTS

| | | | |
|---|---|---|---|
| 7,742,290 B1 | 6/2010 | Kaya | |
| 8,206,047 B1 * | 6/2012 | Isaac | ................... G06F 3/04886 400/472 |

(Continued)

FOREIGN PATENT DOCUMENTS

EP   0422577   4/1991

OTHER PUBLICATIONS

Ackerman, "Acer ICONIA 6120 Dual-Screen Touchbook—14—Core i5 480M—Windows 7 Home Premium 64-bit—4 GB RAM—640 GB HDD review", Retrieved from Internet: https://www.cnet.com/products/acer-6120-dual-screen-touchbook/review/, Mar. 29, 2011, 4 pages.

*Primary Examiner* — Amr A Awad
*Assistant Examiner* — Maheen I Javed
(74) *Attorney, Agent, or Firm* — HPI Patent Department

(57) ABSTRACT

In an example implementation according to aspects of the present disclosure, a method may include determining when a keyboard for a computing device is on a display surface of the computing device and, upon making the determination, using a portion of the display surface covered by the keyboard to provide a configurable backlight for the keyboard.

19 Claims, 3 Drawing Sheets

(51) Int. Cl.
    *G09G 5/24*         (2006.01)
    *G09G 5/373*       (2006.01)
    *G09G 5/38*         (2006.01)

(52) U.S. Cl.
    CPC .......... *G06F 1/1643* (2013.01); *G06F 1/1662* (2013.01); *G06F 1/1669* (2013.01); *G06F 3/02* (2013.01); *G06F 3/0488* (2013.01); *G06F 3/04886* (2013.01); *G09G 5/24* (2013.01); *G09G 5/373* (2013.01); *G09G 5/38* (2013.01); *G09G 2320/0686* (2013.01); *G09G 2354/00* (2013.01)

(58) Field of Classification Search
    CPC ........ G09G 2320/0686; G06F 3/04886; G06F 3/02; G06F 3/0488; G06F 1/1662; G06F 1/1643; G06F 1/1637
    See application file for complete search history.

(56) References Cited

U.S. PATENT DOCUMENTS

| | | | |
|---|---|---|---|
| 8,947,361 B2 | 2/2015 | Oakley | |
| 9,952,629 B2* | 4/2018 | Chae | G06F 1/1677 |
| 2002/0075317 A1* | 6/2002 | Dardick | G06F 3/0481 |
| | | | 715/808 |
| 2003/0235452 A1* | 12/2003 | Kraus | B41J 5/102 |
| | | | 400/472 |
| 2004/0021639 A1 | 2/2004 | Hara | |
| 2005/0073446 A1 | 4/2005 | Lazaridis et al. | |
| 2006/0232195 A1* | 10/2006 | Cok | H01L 51/5265 |
| | | | 313/504 |
| 2007/0103448 A1 | 5/2007 | Cook | |
| 2008/0309589 A1 | 12/2008 | Morales | |
| 2011/0260978 A1* | 10/2011 | Larsen | G06F 3/0238 |
| | | | 345/168 |
| 2012/0229389 A1 | 9/2012 | Nishino | |
| 2013/0154941 A1 | 6/2013 | Moser | |
| 2013/0234949 A1 | 9/2013 | Chornenky | |
| 2014/0111449 A1* | 4/2014 | Lee | G06F 3/039 |
| | | | 345/173 |
| 2014/0333542 A1* | 11/2014 | Barreca | G06F 1/1669 |
| | | | 345/169 |
| 2015/0138698 A1* | 5/2015 | Solland | F16B 2/22 |
| | | | 361/679.01 |
| 2016/0109973 A1* | 4/2016 | Kim | G06F 1/1643 |
| | | | 345/173 |
| 2016/0132145 A1 | 5/2016 | Fourie et al. | |

* cited by examiner

KEYBOARD BACKLIGHTS VIA DISPLAY SURFACES

BACKGROUND

The emergence and popularity of mobile computing has made portable computing devices, due to their compact design and light weight, a staple in today's marketplace. Tablet computers are examples of portable computing devices that are widely used. Tablet computers generally employ a touchscreen on a display surface of the device that may be used for both viewing and input. Users of such devices may interact with the touchscreen via finger or stylus gestures. As an example, an on-screen keyboard may be illustrated on the touchscreen surface for entering characters.

DETAILED DESCRIPTION

As the computing power of portable computing devices, such as tablet computers, continue to increase, users may desire to expand the use of such devices, for example, from solely employing the touchscreen on the display surface of such devices for both viewing and input. As an example, various peripherals may be used to expand the use of the portable computing device. An example of such peripherals include, but is not limited to, a keyboard. With regards to a keyboard, there may be instances when users may desire to enter characters via an external, physical keyboard, particularly when creating content or typing for a prolonged period of time (e.g., creating a document, spreadsheet, or slides).

Examples disclosed herein provide the ability for a display surface of a computing device, such as the tablet computer or a notebook device with a dual screen display, to illuminate a peripheral (e.g., a keyboard) while it is being used to operate the computing device. The illumination given by the display surface may provide a backlight for the peripheral while it is being used, which may be particularly helpful when the peripheral is being used in a dark environment or being used by users that have to regularly look at the peripheral while using it (e.g., hunt and peck typists). By relying on the illumination provided by the display surface to provide a backlight for the peripheral, no backlight is required to be built into the peripheral, which saves cost and keeps complexity of the peripheral low. Also, the thickness of the peripheral may be kept low as well, which may be desirable for users. In addition, all the colors available by the display surface of the computing device may be utilized for offering a backlight that is configurable, as will be further described.

Figure 1:
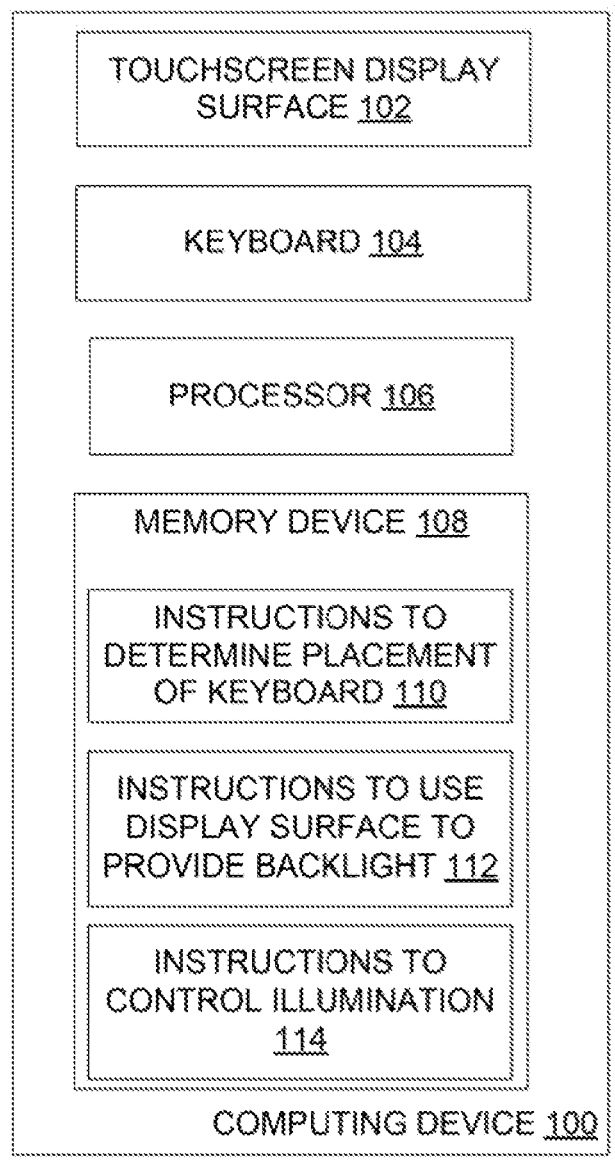
FIG. 1 illustrates a computing device that includes a touchscreen display surface and a physical keyboard that is usable with the computing device, according to an example.

With reference to the figures, FIG. 1 illustrates a computing device 100 that includes a touchscreen display surface 102 and a physical keyboard 104 that is usable with the computing device 100 when the keyboard 104 is on the touchscreen display surface 102, according to an example. As will be further described, illumination provided by the display surface 102 may be used to provide a configurable backlight for the keyboard 104 while it is being used. Examples of the computing device 100 include, but are not limited to, a tablet computer or a notebook device with a dual screen display. As an example, the notebook device with a dual screen display may refer two display members rotatably connected to each other, with one of the display members also serving as a base member. The display member serving as a base member may refer to the touchscreen display surface 102, according to an example.

The computing device 100 depicts a processor 106 and a memory device 108 and, as an example of the computing device 100 performing its operations, the memory device 108 may include instructions 110-114 that are executable by the processor 106. Thus, memory device 108 can be said to store program instructions that, when executed by processor 106, implement the components of the computing device 100. The executable program instructions stored in the memory device 108 include, as an example, instructions to determine placement of the keyboard 104 (110), instructions to use display surface 102 to provide a backlight (112), and instructions to control illumination (114).

Instructions to determine placement of the keyboard 104 (110) represent program instructions that when executed by the processor 106 cause the computing device 100 to determine when the keyboard 104 is on the touchscreen display surface 102. Detection for placement of the keyboard 104 on the touchscreen display surface 102 may vary. As an example, a Hall Effect sensor may be used for detecting placement of the keyboard 104 on the touchscreen display surface 102. For example, the Hall Effect sensor may be disposed within the computing device 100 (e.g., under the touchscreen display surface 102), and detect for the magnetic field generated when a magnetic member disposed within the keyboard 104 is placed within proximity of the Hall Effect sensor. When the magnetic field detected by the Hall Effect sensor reaches or exceeds a threshold value, the computing device 100 may make the determination that the keyboard 104 is disposed or placed on the touchscreen display surface 102. As an example, once the magnetic field detected by the Hall Effect sensor falls below the threshold value, the computing device 100 may determine that the keyboard 104 has been removed from the touchscreen display surface 102.

Instructions to use display surface 102 to provide a backlight (112) represent program instructions that when executed by the processor 106 cause the computing device 100, upon making the determination that the keyboard 104 has been placed on the touchscreen display surface 102, to use a portion of the touchscreen display surface 102 covered by the keyboard 104 to provide a configurable backlight for the keyboard 104. As an example, the backlight may be configurable, based on user preference or context. As mentioned above, all the colors available by the touchscreen display surface 102 of the computing device 100 may be utilized for offering a backlight that is configurable, for example, by a user. With regards to context, based on the lighting of the environment or location that the computing device 100 is in, or the application that is currently running on the computing device 100, among other examples, different illumination colors and different brightness levels could be used for providing the backlight to various portions of the keyboard 104.

As an example of using the touchscreen display surface 102 to provide the backlight for the keyboard 104, the computing device 100 may illuminate a subset of pixels of the display surface 102 covered by the keyboard 104, and turn off other pixels of the display surface 102 covered by the keyboard 104. For example, a user may prefer to have the keys of the keyboard 104 backlit rather than the frame of the keyboard 104 surrounding the keys, or vice versa. Based on the user preference, the appropriate pixels of the display surface 102 covered by the keyboard 104 may be illuminated (e.g., the keys), while other pixels of the display surface 102 covered by the keyboard 104 may be turned off (e.g., the frame of the keyboard 104 surrounding the keys).

In order to promote battery savings, the touchscreen display surface 102 may be an organic light-emitting diode (OLED) display, according to an example. As a result, when certain pixels of the touchscreen display surface 102 covered by the keyboard are not required for backlighting, OLED technology provides the ability to turn off pixels independently, to produce the color black, saving energy in the process. Similarly, as each pixel provides its own illumination, only those pixels required for providing the backlight are turned on. As an example, as the areas on the touchscreen display surface 102 where backlighting is provided may change based on usage, pixels originally turned off may be illuminated to provide the configurable backlight for the keyboard.

As an example, in addition to using the touchscreen display surface 102 to provide the backlight for the keyboard 104, if it is determined that the keys of the keyboard 104 are transparent, the computing device 100 may also illustrate characters from the portion of the display surface 102 covered by the keyboard 104 for each key of the keyboard 104. As a result, when a user presses on a particular key, the touchscreen display surface 102 may detect such key press and process the input entered by the user. With regards to configurability, a number of keyboard character layouts, languages, symbols, and colors may be illustrated, all with the same or different brightness levels. As an example, when entering an address in a GPS application, only the numbers or letters possible are illuminated as a user types, as the GPS application may know which numbers and/or letters would be typed next.

Instructions to control illumination (114) represent program instructions that when executed by the processor 106 cause the computing device 100 to control illumination of another portion of the touchscreen display surface 102 not covered by the keyboard 104. As an example of utilizing the OLED technology described above, the pixels representing the other portion of the display surface 102 not covered by the keyboard 104 may be switched off, in order to promote power savings. This may be particularly useful for notebook devices with a dual screen display, where the display member serving as the base member has the keyboard 104 disposed on it and the other display member is used for viewing purposes. However, rather than switching off the portion of the display surface 102 not covered by the keyboard 104, content originally illustrated on the display surface 102, for example, prior to placement of the keyboard 104, may be rescaled to the portion of the display surface 102 not covered by the keyboard 104, which is particularly helpful when the display surface 102 is the only viewable screen for the computing device 100 (e.g., tablet computer).

Memory device 108 represents generally any number of memory components capable of storing instructions that can be executed by processor 106. Memory device 108 is non-transitory in the sense that it does not encompass a transitory signal but instead is made up of at least one memory component configured to store the relevant instructions. As a result, the memory device 108 may be a non-transitory computer-readable storage medium. Memory device 108 may be implemented in a single device or distributed across devices. Likewise, processor 106 represents any number of processors capable of executing instructions stored by memory device 108. Processor 106 may be integrated in a single device or distributed across devices. Further, memory device 108 may be fully or partially integrated in the same device as processor 106, or it may be separate but accessible to that device and processor 106.

In one example, the program instructions 110-114 can be part of an installation package that when installed can be executed by processor 106 to implement the components of the computing device 100. In this case, memory device 108 may be a portable medium such as a CD. DVD, or flash drive or a memory maintained by a server from which the installation package can be downloaded and installed. In another example, the program instructions may be part of an application or applications already installed. Here, memory device 108 can include integrated memory such as a hard drive, solid state drive, or the like.

Figure 2A:
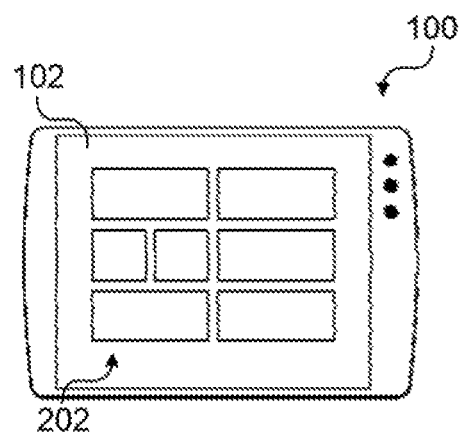
FIGS. 2A-C provide illustrations of how the touchscreen display surface of the computing device may be used for providing a backlight for the keyboard, according to an example.
Figure 2B:
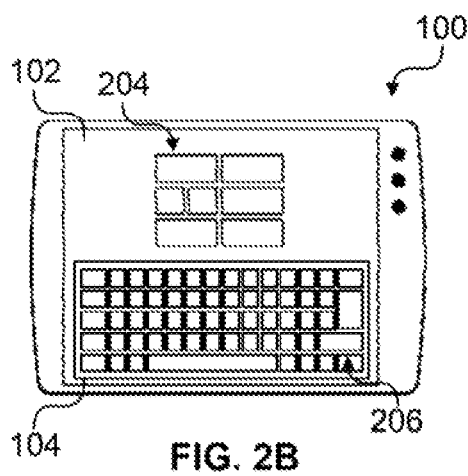
Figure 2C:
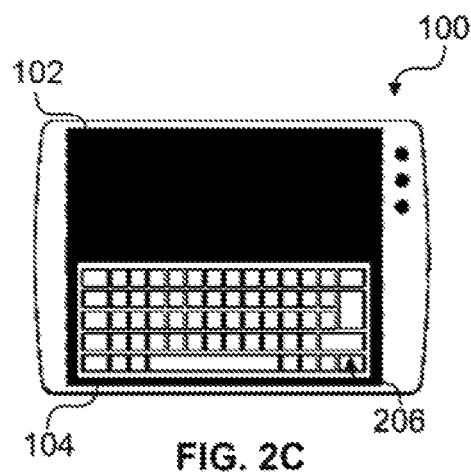

FIGS. 2A-C provide illustrations of how the touchscreen display surface 102 of the computing device 100 may be used for providing a backlight for the keyboard 104, according to an example. Referring to FIG. 2A, prior to placement of the keyboard 104, the whole screen of the touchscreen display surface 102 may be used for providing content, illustrated as 202. However, once the keyboard 104 is disposed on the touchscreen display surface 102, as illustrated in FIG. 2B, the content originally illustrated on the display surface 102 prior to placement of the keyboard 104 (e.g., 202 in FIG. 2A), may be rescaled to the portion of the display surface 102 not covered by the keyboard 104, illustrated as 204. However, in order to promote power savings, the pixels representing the portion of the display surface 102 not covered by the keyboard 104 may be switched off, as illustrated in FIG. 2C, as an example of utilizing the OLED technology described above. This may be particularly useful for notebook devices with a dual screen display, where the display member serving as the base member has the keyboard 104 disposed on it and the other display member is used for viewing purposes.

As an example, detection for placement of the keyboard 104 on the touchscreen display surface 102 may utilize Hall Effect sensors, as described above. For example, a Hall Effect sensor may be disposed within the computing device 100 (e.g., under the touchscreen display surface 102), and detect for the magnetic field generated when a magnetic member disposed within the keyboard 104 is placed within proximity of the Hall Effect sensor. When the magnetic field detected by the Hall Effect sensor reaches or exceeds a threshold value, the computing device 100 may make the determination that the keyboard 104 is disposed or placed on the touchscreen display surface 102. Once this determination is made, the content originally illustrated on the touchscreen display surface 102 may be rescaled, as illustrated in FIG. 2B, or the pixels representing the portion of the display surface 102 not covered by the keyboard 104 may be switched off, as illustrated in FIG. 2C. As an example, once the magnetic field detected by the Hall Effect sensor falls below the threshold value, the computing device 100 may determine that the keyboard 104 has been removed from the touchscreen display surface 102. As an example, any content illustrated on the touchscreen display surface 102 may then be rescaled to occupy the whole screen, as illustrated in FIG. 2A.

As described above, the backlight may be configurable, based on user preference or context, as examples. In addition, all the colors available by the touchscreen display surface 102 may be utilized for offering the backlight. As an example of user preference, if a user prefers to have the keys 206 of the keyboard 104 backlit rather than the frame of the keyboard 104 surrounding the keys 206, the subset of pixels of the display surface 102 covered by the keys 206 may be illuminated while the other pixels of the display surface 102 covered by the frame may be switched off. Similarly, if the user prefers to have the frame backlit rather than the keys 206, the subset of pixels of the display surface 102 covered by the frame may be illuminated while the other pixels of the display surface 102 covered by the keys 206 may be switched off. As an example of configuring the backlight based on context, the lighting of the environment or location that the computing device 100 is in, or the application that is currently running on the computing device 100, among other examples, different illumination colors and different brightness levels could be used for providing the backlight to various portions of the keyboard 104. For example, when entering an address in a GPS application, only the numbers or letters possible are illuminated as a user types, as the GPS application may know which numbers and/or letters would be typed next.

Figure 3:
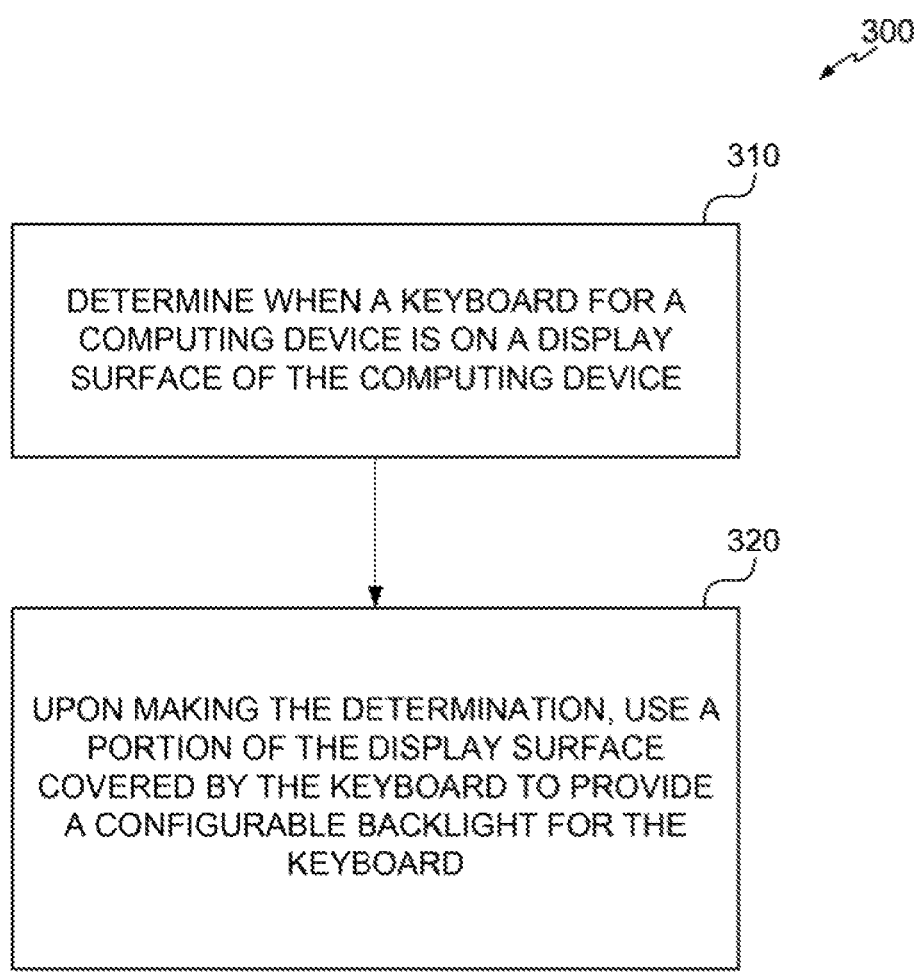
FIG. 3 is a flow diagram in accordance with an example of the present disclosure.

FIG. 3 is a flow diagram 300 of steps taken by a computing device to implement a method for a display surface of the computing device providing a backlight for a keyboard usable with the computing device, according to an example. In discussing FIG. 3, reference may be made to the example computing device 100 illustrated in FIGS. 1-2. Such reference is made to provide contextual examples and not to limit the manner in which the method depicted by FIG. 3 may be implemented.

At 310, the computing device determines when the keyboard is on the display surface of the computing device. Detection for placement of the keyboard on the display surface may vary. As an example, a Hall Effect sensor may be used for detecting placement of the keyboard on the display surface. For example, the Hall Effect sensor may be disposed within the computing device (e.g., under the display surface), and detect for the magnetic field generated when a magnetic member disposed within the keyboard is placed within proximity of the Hall Effect sensor. When the magnetic field detected by the Hall Effect sensor reaches or exceeds a threshold value, the computing device may make the determination that the keyboard is disposed or placed on the display surface.

At 320, upon making the determination that the keyboard is on the display surface of the computing device, the computing device uses a portion of the display surface covered by the keyboard to provide a configurable backlight for the keyboard. As an example, the backlight may be configurable, based on user preference or context. In addition, all the colors available by the display surface of the computing device may be utilized for offering a backlight that is configurable, for example, by a user. With regards to context, based on the lighting of the environment or location that the computing device is in, or the application that is currently running on the computing device, among other examples, different illumination colors and different brightness levels could be used for providing the backlight to various portions of the keyboard.

In addition to providing the backlight for the keyboard, the computing device may also control illumination of the portion of the display surface not covered by the keyboard. For example, upon determining when the keyboard is on the display surface, the computing device may rescale content originally illustrated on the display surface to the portion of the display surface not covered by the keyboard (e.g., see FIG. 2B). In addition, the computing device may rather switch off the other portion of the display surface not covered by the keyboard (e.g., see FIG. 2C).

Although the flow diagram of FIG. 3 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method comprising:
   determining, by a computing device, whether a physical keyboard is on an organic light-emitting diode (OLED) display surface of the computing device; and
   in response to determining that the physical keyboard is on the OLED display surface, using a covered portion, as covered by the physical keyboard, of the OLED display surface to provide a configurable backlight for the physical keyboard by:
      illuminating, by the computing device, a first subset of pixels of the covered portion of the OLED display surface,
      independently turning off a second subset of pixels of the covered portion of the OLED display surface, the second subset of pixels being different from the first subset of pixels, and
      switching off a remaining portion of the OLED display surface not covered by the physical keyboard.

2. The method of claim 1, wherein the OLED display surface is part of a first display member of the computing device, and the computing device further comprises a second display member, the method comprising:
   displaying content on the second display member while using the physical keyboard on the first display member for input.

3. The method of claim 2, wherein the computing device has a dual screen display that comprises the first display member and the second display member.

4. The method of claim 1, wherein areas of the covered portion of the OLED display surface where backlighting is provided change based on usage, by changing subsets of pixels that are illuminated and turned off.

5. The method of claim 1, wherein the illuminating of the first subset of pixels of the covered portion of the OLED display surface comprises:
adjusting a color of the first subset of pixels based on a user preference or context.

6. The method of claim 5, wherein adjusting the color of the first subset of pixels is based on which application is currently running in the computing device.

7. The method of claim 1, comprising:
determining whether keys of the physical keyboard are transparent; and
in response to determining that the keys of the physical keyboard are transparent, displaying characters for the keys on the covered portion of the OLED display surface.

8. The method of claim 1, wherein
the first subset of pixels are covered by keys of the physical keyboard; and
the second subset of pixels are covered by a frame of the physical keyboard.

9. The method of claim 1, wherein the illuminating of the first subset of pixels of the covered portion of the OLED display surface comprises:
selectively illuminating different keys of the physical keyboard using different activated pixels of the first subset of pixels as user input is received by the computing device using the physical keyboard.

10. A computing device comprising:
a touchscreen organic light-emitting diode (OLED) display surface;
a physical keyboard usable with the computing device when the physical keyboard is on and covers a covered portion of the touchscreen OLED display surface; and
a processor to:
determine whether the physical keyboard is on the touchscreen OLED display surface;
in response to determining that the physical keyboard is on the touchscreen OLED display surface:
use the covered portion of the touchscreen OLED display surface to provide a configurable backlight for the physical keyboard by:
illuminating a first subset of pixels of the covered portion of the touchscreen OLED display surface, and
independently turning off a second subset of pixels of the covered portion of the touchscreen OLED display surface, the second subset of pixels being different from the first subset of pixels; and
switch off a remaining portion of the touchscreen OLED display surface not covered by the physical keyboard.

11. The computing device of claim 10, wherein the touchscreen OLED display surface is part of a first display member of the computing device, and the computing device further comprises a second display member, wherein the processor is to:
control display of content on the second display member while using the physical keyboard on the first display member for input.

12. The computing device of claim 11, wherein the computing device has a dual screen display that comprises the first display member and the second display member.

13. The computing device of claim 10, wherein the physical keyboard includes keys and a frame,
the first subset of pixels are covered by the keys of the physical keyboard, and the second subset of pixels are covered by the frame of the physical keyboard.

14. The computing device of claim 10, wherein the illuminating of the first subset of pixels of the covered portion of the touchscreen OLED display surface comprises:
adjusting a color of the first subset of pixels based on which application is currently running in the computing device.

15. The computing device of claim 10, wherein the illuminating of the first subset of pixels of the covered portion of the touchscreen OLED display surface comprises:
adjusting a color and a brightness of the first subset of pixels based on which application is currently running in the computing device.

16. A non-transitory computer-readable storage medium comprising program instructions which, when executed cause a computing device to:
determine when a physical keyboard for the computing device is on an organic light-emitting diode (OLED) display surface of the computing device;
in response to determining that the physical keyboard is on the OLED display surface, use a covered portion, as covered by the physical keyboard, of the OLED display surface to provide a configurable backlight for the physical keyboard by:
illuminating a first subset of pixels of the covered portion of the OLED display surface,
independently turning off a second subset of pixels of the covered portion of the OLED display surface, the second subset of pixels being different from the first subset of pixels, and
switching off a remaining portion of the OLED display surface not covered by the physical keyboard.

17. The non-transitory computer-readable storage medium of claim 16, wherein areas of the covered portion of the OLED display surface where backlighting is provided change based on usage, by changing subsets of pixels that are illuminated and turned off.

18. The non-transitory computer-readable storage medium of claim 16, wherein the illuminating of the first subset of pixels of the covered portion of the OLED display surface comprises:
adjusting a color of the first subset of pixels based on which application is currently running in the computing device.

19. The non-transitory computer-readable storage medium of claim 16, wherein the illuminating of the first subset of pixels of the covered portion of the touchscreen OLED display surface comprises:
adjusting a color and a brightness of the first subset of pixels based on which application is currently running in the computing device.

* * * * *